United States Patent [19]

Dunnam

[11] Patent Number: 5,465,012
[45] Date of Patent: Nov. 7, 1995

[54] ACTIVE FEEDBACK SYSTEM FOR SUPPRESSION OF ALTERNATING MAGNETIC FIELDS

[76] Inventor: Curt Dunnam, 5244 Perry City Rd., Trumansburg, N.Y. 14886

[21] Appl. No.: 998,970

[22] Filed: Dec. 30, 1992

[51] Int. Cl.[6] ............................................. H04B 15/00
[52] U.S. Cl. ......................................... 307/91; 361/139
[58] Field of Search ........................ 324/247, 320; 606/13; 307/91, 89; 361/139, 143, 149, 150, 159

[56] References Cited

U.S. PATENT DOCUMENTS

| | | | |
|---|---|---|---|
| 3,801,877 | 4/1974 | Griese et al. | 361/139 |
| 4,362,992 | 12/1982 | Young et al. | 324/247 |
| 4,380,716 | 4/1983 | Romeo et al. | 315/8 |
| 4,899,110 | 2/1990 | Furukawa | 324/320 |
| 4,932,951 | 6/1990 | Liboff et al. | 606/13 |
| 4,963,789 | 10/1990 | Buhler | 315/8 |

OTHER PUBLICATIONS

Magnetic Cancelling System, Spice Consulting, Bedford, England Jun. 3, 1991.

*Primary Examiner*—William M. Shoop, Jr.
*Assistant Examiner*—Peter Ganjoo
*Attorney, Agent, or Firm*—Salzman & Levy

[57] ABSTRACT

The present invention features a magnetic field compensation system for suppressing alternating or time-varying magnetic fields in a large volume of space. A magnetic sensor detects within a predetermined range of frequencies and generates a signal. A coil or pair of Helmholtz drive coils is positioned into a volume containing the magnetic sensor. A preamplifier is connected to the magnetic sensor for amplifying the signal. A signal processor is connected to the preamplifier for receiving the signal and for providing phase correction and gain. The signal processor has both an averaging and an absolute peak detector for determining magnetic field average and peak excursions. A power amplifier is connected to the coil or pair of Helmholtz drive coils and to the signal processor for receiving and amplifying the processed signal and for applying it to the coil or pair of Helmholtz drive coils.

8 Claims, 4 Drawing Sheets

NOTES:
1. TWO AXIS (BX, BY) SYSTEM SHOWN.
THREE AXIS SYSTEM ADDS BZ AT BRANCHPOINTS MARKED "*".
2. XL2, YL2 REFER TO "TRIP" SETPOINTS.
3. XL1, YL1 REFER TO "WARNING" SETPOINTS.

ACTIVE FEEDBACK SYSTEM FOR SUPPRESSION OF ALTERNATING MAGNETIC FIELDS

RELATED PATENT APPLICATION

The present patent application is related to U.S. patent application Ser. No. 07/998,965, assigned to the present assignee, for "Feedback Enhanced Sensor for Alternating Magnetic Fields", filed concurrently herewith and is hereby incorporated by reference.

BACKGROUND OF THE INVENTION

The present invention relates to suppression of magnetic fields and, more particularly, to an active feedback system for suppressing extremely low frequency (e.l.f.) alternating magnetic fields in a large volume of space. For purposes of the application, it should be understood that the word "alternating" is used to represent any time-varying magnetic field.

Time-varying magnetic fields are generated by a.c. mains wiring and associated distribution transformers. Occasionally, switching high current d.c. circuits or moving d.c. powered equipment and vehicles or even movement of large ferromagnetic bodies in the earth's geomagnetic field can generate extremely low frequency a.c. magnetic fields.

Such magnetic fields may be troublesome. For example, prolonged exposure to even milligauss (mG) magnetic disturbances may result in danger to the health of humans and animals. A recent Swedish study, for example, was reported at a conference sponsored by the U.S. Department of Energy and the Electric Power Research Institute. The study indicated that children exposed to relatively weak magnetic fields (0.1–0.3 µTeslas) from power lines near their homes develop leukemia at almost four times the expected rate. Another found that men exposed to similar magnetic field levels in the workplace had three times the expected rate of one form of leukemia.

Moreover, uncontrolled magnetic fields may adversely affect sensitive equipment. For example, both scanning (SEM) and transmission (TEM) electron microscope resolution is known to deteriorate when spurious magnetic fields above approximately 0.1 µTesla are present.

While certain passive shielding mechanisms, notably those fabricated from "mu-metal" materials, can isolate sensitive equipment or personnel from magnetic fields, such mechanisms are generally intended only to protect limited areas. As a practical matter, it has proven to be impossible to compensate for magnetic disturbances, at a reasonable cost, for volumes of space as great as a room, much less a building.

U.S. Pat. No. 4,380,716 issued to Romeo et al on Apr. 19, 1983, discloses an external d.c. (static) magnetic field compensator for color aberration due to axial fields traversing a CRT. Color purity signals from monochromatic sensors located at the CRT corners are used in a zero frequency response, closed loop, servo feedback system. Current is applied to a compensation coil set providing first order cancellation of color distortions.

U.S. Pat. No. 4,963,789 issued to Buhler on Oct. 16, 1990, discloses a technique for dynamically neutralizing a magnetic field within a specified volume by generating compensating magnetic fields at a number of locations around the volume, sensing the field in the volume via fluxgate sensors, and controlling the value of the compensating fields in a closed loop, microprocessor-controlled servo system to null the field. An external mu-metal shield and degaussing coil are provided as part of the servo magnetic compensation system. Low level e.l.f. magnetic fields are not discussed in Buhler, since the application of the technique is for neutralizing relatively high level magnetic fields to correct CRT color and distortion.

A magnetic field cancelling system Model No. SC07, manufactured by Spicer Consulting, Bedford, England, is described in a brochure dated Jun. 3rd, 1991. The system is intended to reduce alternating ambient magnetic fields and can be used to improve the performance of electronic instruments which are sensitive to magnetic fields, such as electron microscopes and electron beam metrology tools. The system contains three power amplifiers which drive currents through cables to generate a cancelling field. X, Y and Z magnetic fields are measured; corresponding signals are amplified and fed back in anti-phase to the power amplifiers. The negative feedback reduces the field at the sensor location.

It would be advantageous to provide a cost-effective magnetic field compensation system.

It would also be advantageous to ensure that such a compensation system were reconfigurable and/or portable.

It would also be advantageous to provide a compensation system responsive to a wide range of frequencies and/or amplitudes of time-varying magnetic fields.

It would also be advantageous to provide a magnetic field compensation system that is both easily installable and easily operable.

SUMMARY OF THE INVENTION

In accordance with the present invention, there is provided a magnetic field compensation system for suppressing alternating magnetic fields in a large volume of space. A magnetic sensor detects a free space magnetic field within a predetermined range of frequencies and generates a signal. A coil or pair of Helmholtz drive coils is positioned at the periphery of the volume surrounding the magnetic sensor. A preamplifier is connected to the magnetic sensor for amplifying the signal. A signal processor is connected to the preamplifier for receiving the signal and for providing phase correction and gain. The signal processor has both an averaging and an absolute peak detector for determining magnetic field average and peak excursions. A power amplifier is connected to the coil or pair of Helmholtz drive coils and to the signal processor for receiving and amplifying the processed signal and for applying it to the pair of Helmholtz drive coils.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

Figure 1A:
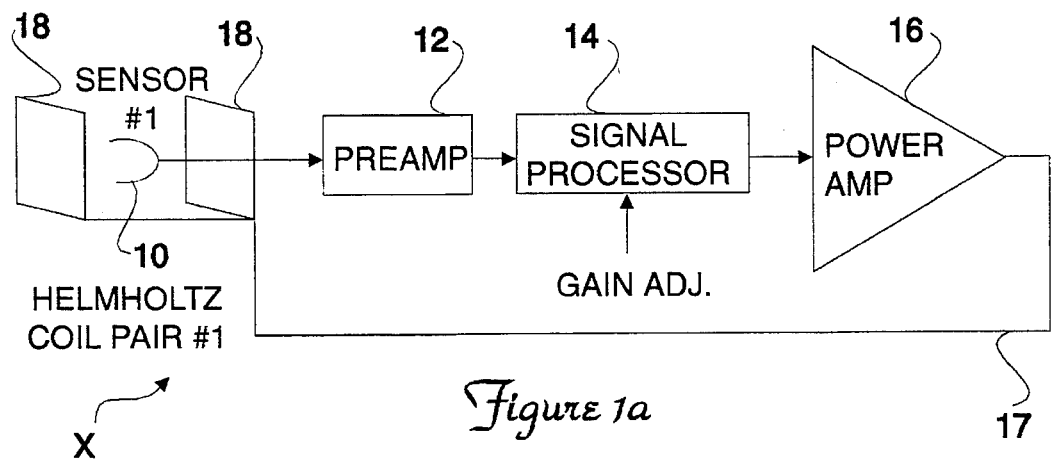
FIGS. 1a, 1b and 1c are simplified block diagrams of a composite active feedback system for suppressing a magnetic field in each of three orthogonal planes, respectively, in accordance with the present invention.
Figure 1B:
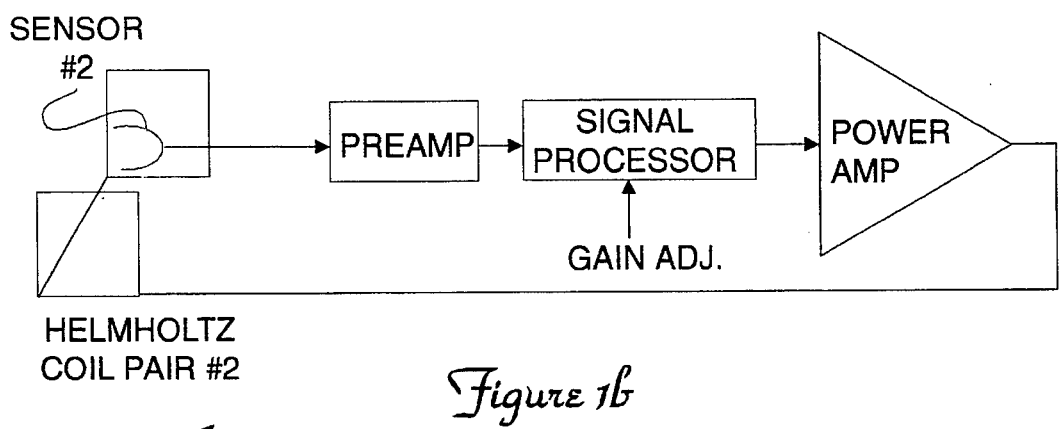
Figure 1C:
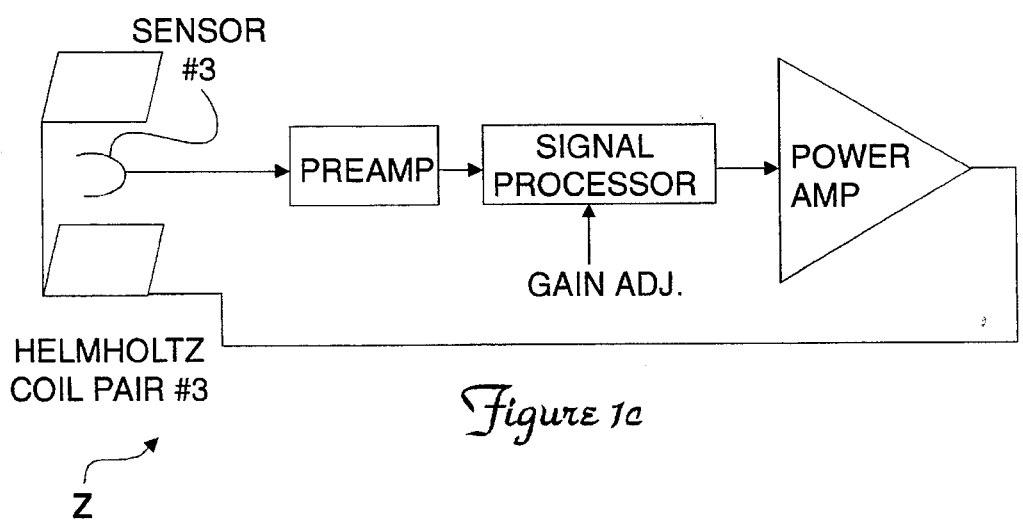

Referring now to FIGS. 1a, 1b and 1c, there are shown simplified block diagrams of the active feedback system for suppressing a magnetic field in each of three orthogonal planes, respectively. A separate channel X, Y and Z is used for each of the orthogonal axes. Since all three channels have the same structure and function, in the interest of brevity only one channel X is discussed in greater detail herein.

Two channel (X and Y) systems are typically used for protection of electron microscope sites and similar applications where only magnetic flux components perpendicular to the electron beam axis need be compensated. However, personnel safety and biological experimentation applications typically require three-axis X, Y and Z protection.

A magnetic sensor 10 is provided and is described in greater detail in the aforementioned copending patent application Ser. No. 07/998,965, for "Feedback Enhanced Sensor for Alternating Magnetic Fields". It should be understood that, without departing from the scope of the invention, multiple sensors, not shown, can be incorporated along a single axis, to provide more accurate magnetic field gradient detection. Moreover, in alternate embodiments, the sensor(s) need not be disposed proximate the center of the protected volume, but may be located near the compensating coils described below. Connected to magnetic sensor 10, for receiving a signal generated thereby, is a preamplifier 12, to which is connected a signal processor 14, described in greater detail hereinbelow.

A power amplifier 16, of suitable bandwidth and drive capability, is connected to signal processor 14. A Helmholtz drive coil pair (compensation coils) 18 is adapted to receive a relatively high power correction signal generated by power amplifier 16. Compensation drive coils 18 can be any suitable size and can be placed in any suitable symmetric position relative to sensor 10 to accommodate the volume of space to be protected from magnetic fields. Ideally, compensation drive coils 18 are installed at the vertices of the room containing the instrument or experiment to be protected from stray a.c. fields. Generally, system performance is enhanced with increasing distance from the compensation drive coils 18 to the magnetic sensor 10. Proper phasing of the individual coils in each Helmholtz pair 18 is also essential to proper operation of the system. For these coil sets, each coil's field vector, as seen at the coil center, must point in the same direction. Each of the pair of coils 18 typically consists of 15 turns of 18 to 22 awg wire and is realized by cross-connecting individual conductors in a multiconductor cable. Each pair of coils 18 consists of two of the individual coils, one in/on each facing wall of the room, or one in/on the ceiling and one in/on the floor of the room or two similarly spaced parallel planes.

In operation, one orthogonal component, say X, of the target field occurs when the signal originating at magnetic sensor 10 is amplified and fed back over line 17 to compensation coils 18, in suitable phase over the frequency band of interest. By applying direct negative feedback, in lieu of a derived servo error (as has been the practice in the prior art, such as the system taught by GRIESE, et al. in U.S. Pat. No. 3,801,877), system signal processing requirements are simplified and compensation bandwidth is increased.

By contrast, a field-compensation servo system develops a time-averaged error signal representing the difference between a compensating signal and the ambient field. The resultant error signal is integrated and used to adjust the level of a d.c. source or low-frequency waveform generator. The necessity of an integrator in the servo configuration limits the effective bandwidth with respect to a direct negative feedback configuration, assuming both systems utilize similar sensor and driver/coil components. Servo-like systems are best suited to nulling d.c. fields, where the large, effective d.c. gain of the servo's integrator ensures a vanishingly small d.c. error term.

Although the principle of negative feedback is well known in electrical engineering, a practical field compensation system also requires a simple operator control and resolution of many secondary engineering details, not all of which are necessary to practice the instant invention.

Figure 2:
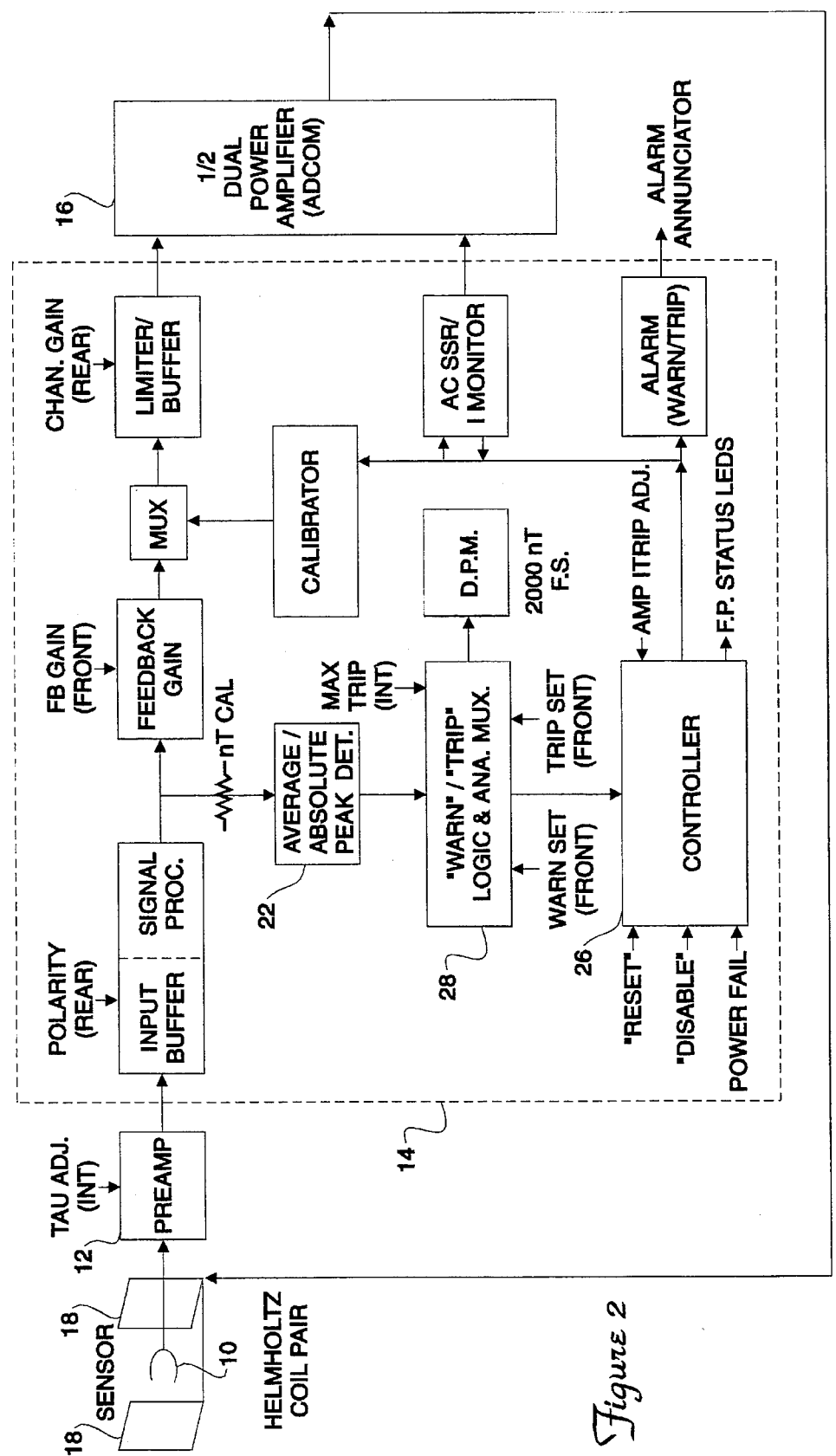
FIG. 2 is a more detailed block diagram of the present invention in one of the three planes depicted in FIGS. 1a, 1b or 1c.

Referring now also to FIG. 2, there is shown a more detailed block diagram of the signal processor 14 (FIG. 1a) along the X-axis. Time-varying magnetic fields in the frequency passband of the magnetic sensor 10 are converted to electrical signals, which are amplified by preamplifier 12. Positive feedback produces a negative input impedance in preamplifier 12 to cancel most of the sensor coil resistive component. The low frequency response of magnetic sensor 10 is thus extended by several orders of magnitude compared to the intrinsic L/R response of the coil/core combination. Such extension of the low frequency response allows higher system gain and, consequently, greater closed loop field suppression at a.c. mains fundamental frequencies in the range of 50 to 60 Hz. The cross-section of magnetic sensor core 10 is also reduced by at least an order of magnitude compared to an uncompensated coil/core of equivalent response.

Connected to the incoming signal line from preamplifier 12 within signal processor 14 is a peak detector 22. An internal switch or jumper, not shown, can be used to direct peak detector 22 to perform an averaging or an absolute peak detection function on the signal for display. The averaging detector function can be used for the majority of installations, but absolute peak detection permits readout of magnetic field peak excursions as may be required for certain applications such as electronic equipment calibration.

Peak detector 22 consists of two cascaded, peak-hold stages, not shown. The initial stage is an absolute peak detector of a first (shorter) time constant; and the second stage is a peak detector of programmable (initially longer) second time constant. When the first peak-detected signal falls below the second peak-detected signal by a predetermined percentage, preset by a ratio of two resistors (not shown), the second peak detector switches to a shorter time constant which tracks the faster discharge curve of the first peak detector. The advantage of this composite peak detector arrangement is increased digital display stability and, hence, improved display readability.

Figure 2A:
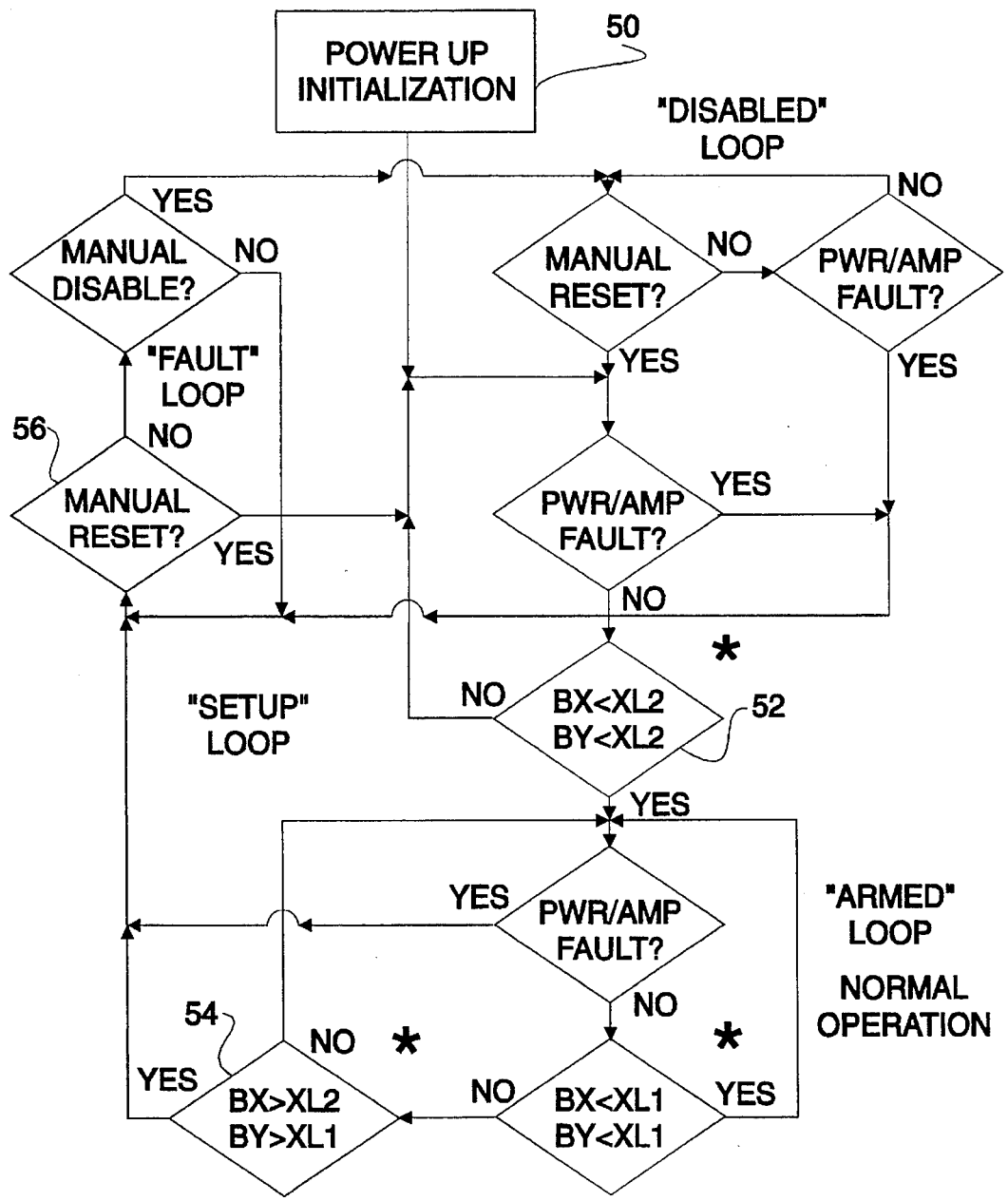
FIG. 2a is a flow chart depicting controller operation.

A controller 26 is provided to facilitate initial setup of the apparatus. An algorithm, whose flow chart is shown in FIG. 2a, resides in controller 26. Initially (at power up), step 50, the system ignores field readings which may exceed the trip setpoint. In other words, if the ambient field exceeds either of the X, Y or Z channel trip levels at power-up or manual reset, the controller 26 will not shut down again until the ambient level is reduced below the trip point at least once. In this way, the driver amplifier is not shut down before initial feedback gain adjustment is completed.

Once the ambient field level has been reduced below the trip setpoint, step 52, controller 26 re-enables its supervision over the ambient field levels. When the trip level (as determined by logic and analog multiplexer 28, for any of the supervised channels X, Y or Z (FIGS. 1a–1c)) is exceeded, step 54, power amplifier 16 is shut off until manually reset, step 56.

A delay of approximately six seconds is incorporated in controller 26 to accommodate magnetic field transients which exceed the trip setpoint. Such transients typically occur when switching magnification ranges in electron microscopy, or may be caused by other nearby transient events such as power line faults, lightning strikes, etc.

Also included in controller 26, but not shown, are fault detection subsystems to detect: (a) power anomalies by monitoring pass/fail limits for all internal voltage sources; and (b) power amplifier a.c. line current with respect to internal limit adjustment.

Calibration of the active feedback magnetic field compensation system is an optional procedure which permits a site-specific calibration. To calibrate the system, both X- and Y-axis FB GAIN dialpots should be preset to their full counter-clockwise positions (0.0 setting). The unit is then powered up and the display is illuminated for the range of 0 through 1999 nTeslas (0–19.99 mG). The WARN pushbutton is then pressed and WARN trimpots are individually set to appropriate values, usually 50% above the expected operating value. Similarly, the TRIP pushbutton is pressed and TRIP trimpots are individually set to appropriate values, usually the maximum tolerable ambient field value. Either setpoint in any channel (dimension) can be read at any time by depressing the appropriate bushbutton. Setpoint trimpot read operations do not disturb normal functioning of the processor.

Pickup sensor positioning and channel meter calibration is finalized by setting an X-NULL/Y-NULL switch, not shown, to either the up (X-axis) or down (Y-axis) position and adjusting the corresponding coil for minimum digital panel meter (D.P.M.) response for its channel. Next, the display value of the excited channel is adjusted by means of an internal X-CAL/Y-CAL trimpot to agree with the reading of the calibration system. This null/calibration procedure is repeated for the second axis.

The digital panel meter displays either the peak or average a.c. magnetic field component. The detection mode is selected by an internal jumper, not shown. Full scale indication is 1999 nTeslas (corresponding to an equivalent maximum m.k.s. reading of 19.99 mG).

A differential-input buffer section provides rejection of common mode noise and interference which may occur due to ground loop currents between the preamplifier and controller enclosures. The input buffer section also provides a d.c. zero response to prevent erroneous display readings, which may be caused by preamplifier d.c. offsets. Phase compensation at the high-frequency cutoff point is also provided.

An uncalibrated signal from the input buffer is routed to an output limiter/buffer section via a FEEDBACK GAIN control. The output limiter/buffer is provided to ensure a low source impedance to the companion power amplifier, to limit the maximum output signal to a value compatible with the output driver amplifier, and to provide a convenient means of adjusting the maximum open loop gain range, via a trimpot, not shown. A second, calibrated signal is routed to the peak and averaging detectors 22 and display for each axis.

Although a multi-channel analog signal processor 14 is used in the preferred embodiment, described hereinabove, the invention is not intended to be limited thereby, and a digital signal processor, well known to those skilled in the art, may be used without departing from the scope of the invention.

Figure 3:
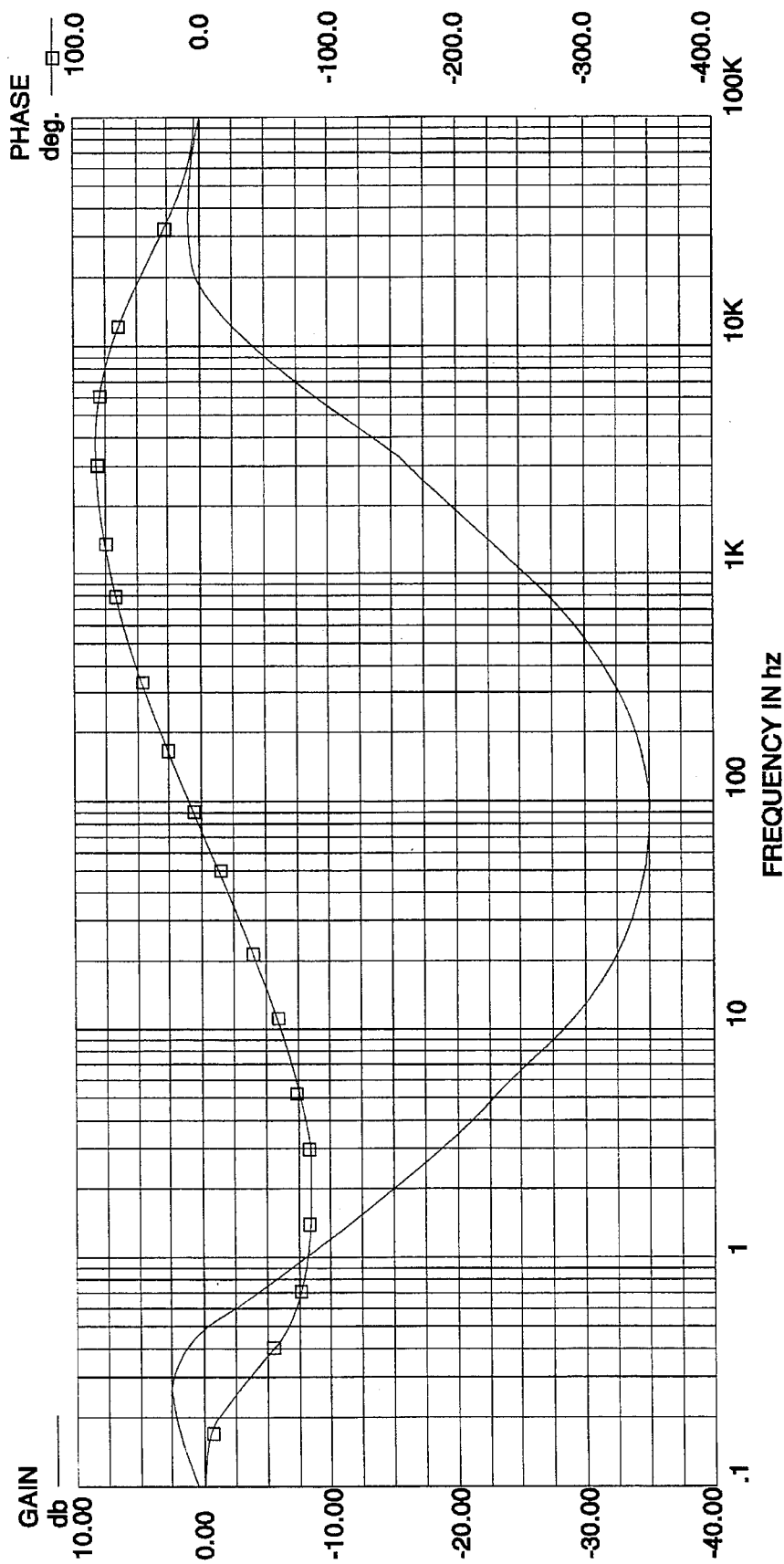
FIG. 3 is a graphical representation of the closed-loop magnetic field attenuation vs. frequency characteristic, which illustrates the compensation curve of the present invention.

Referring now also to FIG. 3, there is shown a graphical representation of magnetic field attenuation vs. frequency, which illustrates the closed-loop compensation (i.e., attenuation vs. frequency) curve of the present invention. The graph represents magnetic field attenuation over a typical EM site volume of 3 m$^3$. Maximum field attenuation in the presence of ferromagnetic shrouds, etc., is approximately 35 dB at a.c. power supply fundamental frequency of 50/60 Hz and low harmonics. The free space attenuation is approximately 44 dB (factor of 160). Attenuation factor is constant for incident magnetic fields from 50 nTeslas (0.5 mG) to at least 10 μTeslas (100 mG) in the X–Y plane.

When the inventive system is in operation at maximum stable closed-loop suppression, reduction of the ambient magnetic field may be predicted as:

$$\frac{1}{1+G}$$

where G is a complex number describing the effective open-loop gain over the frequency range of interest. Dynamic range of the system is defined by the ratio of highest to lower compensable levels, determined by available driver power and sensor noise floor, respectively.

A normal installation with large ferromagnetic objects in the protected volume will typically exhibit 35 dB field suppression. When magnetic pick-up coils 10 are mounted on an electron microscope column and the Helmholtz coils 18 are properly positioned at the periphery of the electron microscope volume, the a.c. mains induced fields are suppressed by 30 dB (factor of 32) to 40 dB (factor of 100) over a frequency range of 10 Hz to 1 kHz. In the laboratory, field attenuation of approximately 54 dB has been achieved. In the context of a typical electron microscope site installation, where only 14 dB of field reduction is required, the minimum field attenuation of 30 dB provides a very conservative margin of security.

Field attenuation of at least 26 dB may be obtained for a.c. field components in the range of 0.001 Hz to 10 kHz over an unlimited volume of space. Rooms or buildings greater than approximately 40 m$^3$ may be protected by subdivision into independent protected sections, the maximum size of each being determined by the gradient of the incident field. Although the field attenuation is constant, the maximum field which may be compensated is a function of output drive power and geometry of the coils 18. Test data indicate that incident field levels to 100 milligauss may be compensated over 40 m$^3$ with driver output power on the order of 50 watts per channel.

Frequency ranges of interest are typically 10 Hz to 1 kHz for compensation of power line magnetic fields in electron microscopy, personnel safety, biological and electronic instrument calibration applications, and 0.001 Hz to 1 kHz for protection of Nuclear Magnetic Resonance (NMR) devices and certain electron microscopy sites. Unfortunately, bandlimited protection, as is known in prior art CRT compensating systems, uses sensors of poor high frequency response. In contrast, the latter application example requires a sensor with a "near-d.c." magnetic field response, a low noise floor, and good high frequency response. Typically, fluxgate magnetometer pickups would be selected for this class of service at higher total system cost. However, fluxgate magnetometers exhibit excess phase shift, which limits high frequency closed-loop gain and, therefore, maximum field attenuation.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A magnetic field compensation, closed-loop, wideband, negative-feedback system for suppressing alternating magnetic fields in a large volume of space, comprising:

a) sensing means for detecting a predetermined range of simultaneous frequencies and for generating a first signal responsive thereto, said sensing means exhibiting a substantially constant phase shift over said predetermined range of simultaneous frequencies;

b) a pair of driven coils for generating a compensating magnetic field, said pair of driven coils being disposed in a close approximation of Helmholtz geometry;

c) signal processing means operatively connected to said sensing means for receiving said first signal generated thereby and for generating a second signal, said second signal being derived from said first signal and incorporating predetermined gain and phase correction thereof, said signal processing means further comprises an absolute peak detector for determining magnetic field peak excursions; and d) power amplifying means operatively connected to said pair of driven coils and to said signal processing means for receiving and amplifying said second signal therefrom and for applying said amplified signal to said pair of driven coils, said power amplifying means, said pair of driven coils, said sensing means, and said signal processing means forming a closed-loop, wideband, negative-feedback suppression system, said suppression system having sufficient closed-loop gain to counteract a predetermined, highest anticipated instantaneous magnetic field.

2. The magnetic field compensation system for suppressing alternating magnetic fields in accordance with claim 1, wherein said sensing means comprises a magnetic field sensor means surrounding a volume of maximum alternating magnetic field suppression.

3. The magnetic field compensation system for suppressing alternating magnetic fields in accordance with claim 2, further comprising:

e) a preamplifier operatively connected to said sensing means and to said signal processing means for amplifying said first signal from said sensing means prior to applying said first signal to said signal processing means.

4. A magnetic field compensation, closed-loop, negative-feedback system for suppressing alternating magnetic fields in a large volume of space, comprising:

a) first sensing means for detecting a predetermined range of simultaneous frequencies along a first axis and for generating a first sensor signal responsive thereto;

b) a first pair of driven coils for generating a first compensating magnetic field;

c) second sensing means for detecting a predetermined range of simultaneous frequencies along a second axis orthogonal to said first axis and for generating a second sensor signal responsive thereto;

d) a second pair of driven coils for generating a second compensating magnetic field orthogonal to said first compensating magnetic field, said first and second pair of driven coils including Helmholtz drive coils;

e) signal processing means having an absolute peak detector for determining magnetic field peak excursions, said signal processing means operatively connected to said first and second sensing means for receiving said first and second sensor signals generated thereby and for generating a signal, incorporating predetermined gain and phase correction thereof, and further incorporating a function for maximizing orthogonality between axes; and f) power amplifying means operatively connected to said first and second pairs of coils and to said signal processing means for receiving and amplifying said signal therefrom and for applying said amplified signal to said pairs of coils, said power amplifying means, said first and second pairs of driven coils, said first and second sensing means, and said signal processing means forming a closed-loop, negative-feedback suppression system;

g) third sensing means for detecting a predetermined range of simultaneous frequencies along a third axis orthogonal to both said first and said second axes and for generating a third sensor signal responsive thereto; and h) a third pair of drive coils for generating a third compensating magnetic field orthogonal to both of said first and second orthogonal compensating magnetic fields;

wherein said signal processing means is operatively connected to said third sensing means for receiving said third sensor signal generated thereby;

and wherein said power amplifying means is operatively connected to said third pair of coils for applying said amplified signal to said third pair of coils.

5. The magnetic field compensation system for suppressing alternating magnetic fields in accordance with claim 4, wherein said first and second sensing means comprise magnetic sensors surrounding a volume of maximum alternating magnetic field suppression.

6. The magnetic field compensation system for suppressing alternating magnetic fields in accordance with claim 5, further comprising:

g) first and second preamplifiers operatively connected to said first and second sensing means, respectively, and to said signal processing means for amplifying said first and second sensor signals, respectively, prior to applying said first and second sensor signals to said signal processing means.

7. The magnetic field compensation system for suppressing alternating magnetic fields in accordance with claim 4, further comprising:

g) third sensing means for detecting a predetermined range of simultaneous frequencies along a third axis orthogonal to both said first and said second axes and for generating a third sensor signal responsive thereto; and h) a third pair of drive coils for generating a third compensating magnetic field orthogonal to both of said first and second orthogonal compensating magnetic fields;

wherein said signal processing means is operatively connected to said third sensing means for receiving said third sensor signal generated thereby;

and wherein said power amplifying means is operatively connected to said third pair of coils for applying said amplified signal to said third pair of coils.

8. The magnetic field compensation system for suppressing alternating magnetic fields in accordance with claim 7, further comprising:

i) a third preamplifier operatively connected to said third sensing means and to said signal processing means for amplifying said third sensor signal prior to applying said third sensor signal to said signal processing means.

* * * * *